Oct. 26, 1926.
W. G. CHAPMAN
ICE SCOOTER
Filed March 6, 1926
1,604,680
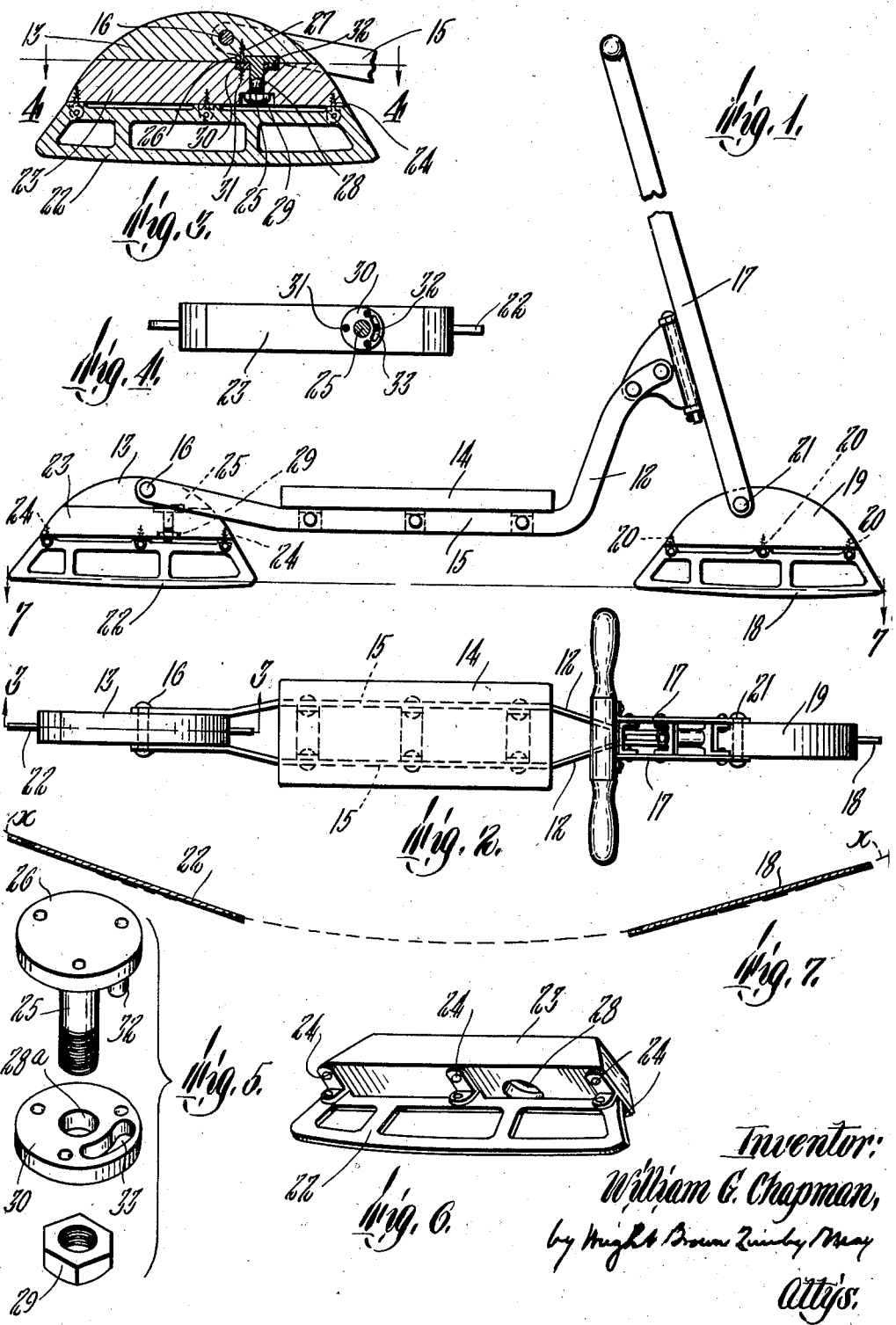

Patented Oct. 26, 1926.

1,604,680

UNITED STATES PATENT OFFICE.

WILLIAM GORDON CHAPMAN, OF NASHUA, NEW HAMPSHIRE.

ICE SCOOTER.

Application filed March 6, 1926. Serial No. 92,722.

This invention relates to a child's vehicle of the "scooter" type, the running gear of the vehicle being runners adapted to run on ice, there being a front steering runner, which is dirigible by a steering post to steer the vehicle, and a rear runner following the front runner.

The chief object of the invention is to provide a scooter, the rear runner of which is adapted to turn on a vertical axis, so that its elongated ice-engaging edge will conform to the path of the front runner, whether the path be straight or curved, the edge of the rear runner being thus adapted to run in alinement with a curved path without retarding the progressive movement of the scooter, as it would if incapable of turning on a vertical axis.

Other incidental objects will appear as the description proceeds.

Of the accompanying drawings forming a part of this specification,—

Figure 1 is a side elevation of a scooter embodying the invention.

Figure 2 is a top plan view of the same.

Figure 3 is a section on line 3—3 of Figure 2.

Figure 4 is a section on line 4—4 of Figure 3, and a top plan view of the rear runner.

Figure 5 shows in perspective the devices shown in section by Figure 3, for connecting the rear runner with the rear terminal hereinafter described of the scooter body.

Figure 6 is a perspective view of the rear runner.

Figure 7 is a section on line 7—7 of Figure 1, showing the runners moving on a curved path.

The same reference characters indicate the same parts in all of the figures.

The body of the scooter includes a front terminal 12, a rear terminal 13, and a platform 14. The front terminal is preferably formed by the connected upturned ends of two longitudinal frame bars 15, and the rear terminal 13 is preferably connected by a transverse stud 16, with the spaced apart rear ends of the frame bars, so that the rear terminal is adapted to oscillate independently in a vertical plane for a purpose hereinafter described. The rear terminal may, however, be a rigid part of the scooter body, so that it is not adapted to oscillate independently. 17 indicates a dirigible steering post, pivotally connected with the front terminal 12, so that it may turn on its longitudinal axis.

Connected with the steering post and dirigible thereby is a single steering front runner, preferably composed of an ice-engaging blade 18, and a block 19 to which the blade is rigidly secured, preferably by screws 20, driven through ears on the blade into the block 19. The front runner may be connected with the steering post by any suitable means. In this instance, the block 19 is connected by a transverse pivot stud 21, with the forked lower end of the steering post. The front runner is thus adapted to oscillate in a vertical plane, so that the forward end of its blade may pass over an obstruction encountered by it.

Connected with the single rear terminal 13 is a rear runner, preferably composed of an ice-engaging blade 22, and a block 23, the blade being rigidly secured to the block by any suitable means, such as screws 24, driven through ears on the blade into the block.

I provide means connecting the rear runner with the rear terminal 13, to permit said runner to turn on a vertical axis and conform to any steering adjustment of the front runner, so that when the front runner is adjusted to cause its blade 18 to move in a curved path $x$ $x$, the rear runner will conform to said path as shown by Figure 7. Said means is preferably embodied in a vertical stud 25, having a head 26, attached by screws 27, to the rear terminal 13, and a vertical bearing 28, in the block 23. The stud is inserted in the bearing, and the block 23 is adapted to turn horizontally on the stud.

A nut 29 engaged with the threaded lower end of the stud 25, and set up against the under side of the block 23, confines the block against the terminal 13. The bearing 28 is preferably formed in part by the wall of an orifice $28^a$, in a bushing 30, attached by screws 31 to the block 23.

To limit the turning movements of the rear runner so that it cannot turn too far in either direction, I provide stop means carried by the rear terminal and the rear runner, said means being embodied, in this instance, in a stop stud 32, fixed to and projecting downward from the head 26, and a curved slot 33, in the bushing 30, receiving the stop 32, the ends of the slot forming complemental stops cooperating with the stop 32.

The stud 25 and bearing 28 are located between the midlength and forward end portions of the rear runner, as shown by Figures 3 and 4, and are in vertical alinement with a portion of the acting edge of the rear runner, as indicated by Figure 4, so that the axis, if prolonged downward, would intersect the acting edge of the rear runner at a point between the midlength and forward end portions thereof. The major portion of the rear runner, therefore, trails behind the pivotal connection formed by the stud and bearing and by its engagement with an ice surface causes the rear runner to automatically follow the path of the front runner and conform to any steering adjustment thereof.

The terminal 13 has a flat bottom face, and the block 23 a flat top face, bearing movably on the bottom face of the terminal. It will be seen that when the terminal 13 is adapted to oscillate in a vertical plane, as above described, the rear runner is adapted to similarly oscillate and pass over obstructions encountered by the front end of the blade 22.

I claim:

1. A scooter comprising a body having front and rear terminals, a dirigible steering post connected with the front terminal, a single steering front runner connected with and dirigible by the steering-post to steer the scooter, a single rear runner, and a pivotal connection between the rear terminal and the rear runner, permitting the latter to turn on a vertical axis which is located between the midlength and forward end portions of the runner, and is in vertical alinement with a portion of the acting edge thereof, so that the major portion of the rear runner trails behind the said connection and causes said runner to follow the path of the front runner and conform to any steering adjustment thereof.

2. A scooter comprising a body having front and rear terminals, a dirigible steering post connected with the front terminal, a single steering front runner connected with and dirigible by the steering post to steer the scooter, a single rear runner, and a pivotal connection between the rear terminal and the rear runner, permitting the latter to turn on a vertical axis which is located between the midlength and forward end portions of the runner, and is in vertical alinement with a portion of the acting edge thereof, so that the major portion of the rear runner trails behind the said connection and causes said runner to follow the path of the front runner and conform to any steering adjustment thereof, and stop means fixed to the rear terminal and the rear runner, and limiting the turning movement of the latter.

3. A scooter comprising a body having front and rear terminals, a dirigible steering post connected with the front terminal, a steering front runner connected with and dirigible by the steering post to steer the scooter, the rear terminal member being provided with a flat bottom face, a fixed stud and a fixed stop each projecting downward from said face, a rear runner including a blade and a block fixed to the blade, the block being provided with a flat top face bearing on the bottom face of the rear terminal member, a bearing receiving said stud, and a slot receiving said stop member, the ends of the slot constituting complemental stop members cooperating with the fixed stop in limiting turning movements of the block on the stud.

4. A scooter comprising a body having front and rear terminals, a dirigible steering post connected with the front terminal, a steering front runner connected with and dirigible by the steering post to steer the scooter, a rear runner, means connecting it with the rear terminal to permit the rear runner to turn on a vertical axis, and conform to any steering adjustment of the front runner, the rear terminal being adapted to turn on a transverse axis so that the rear runner may oscillate in a vertical plane and pass over an obstacle encountered by its forward end, the forward runner being also adapted to similarly oscillate.

5. A scooter comprising a body including a platform-supporting frame having a front terminal, and a rear terminal connected with the frame by a transverse axis so that it may oscillate in a vertical plane, a dirigible steering post connected with the front terminal, a steering front runner connected with and dirigible by the steering post, said runner being composed of a blade and a block fixed to the blade and connected with the steering post by a transverse axis so that the front runner is adapted to oscillate in a vertical plane, a rear runner, and means connecting it with the rear terminal to permit the rear runner to turn on a vertical axis and conform to any steering adjustment of the front runner, the rear runner being oscillatable in a vertical plane with the rear terminal.

In testimony whereof I have affixed my signature.

WILLIAM GORDON CHAPMAN